United States Patent
Hamama et al.

(10) Patent No.: US 8,478,511 B2
(45) Date of Patent: Jul. 2, 2013

(54) SYSTEM AND METHOD FOR KNOCK DETECTION BASED ON ETHANOL CONCENTRATION IN FUEL

(75) Inventors: Wajdi B. Hamama, Whitmore Lake, MI (US); Craig M. Sawdon, Williamston, MI (US); Eric B. Ferch, Northville, MI (US); Matthew David Defever, Farmington Hills, MI (US); Hillary L. Broadus, Commerce Township, MI (US)

(73) Assignee: GM Global Technology Operations LLC

( * ) Notice: Subject to any disclaimer, the term of this patent is extended or adjusted under 35 U.S.C. 154(b) by 468 days.

(21) Appl. No.: 12/899,002

(22) Filed: Oct. 6, 2010

(65) Prior Publication Data

US 2012/0048234 A1 Mar. 1, 2012

Related U.S. Application Data

(60) Provisional application No. 61/378,576, filed on Aug. 31, 2010.

(51) Int. Cl.
*G06F 19/00* (2011.01)

(52) U.S. Cl.
USPC ............ 701/111; 123/1 A; 123/575; 73/35.01

(58) Field of Classification Search
USPC .................. 701/111, 114; 123/1 A, 575, 434, 123/475, 479, 494; 73/35.01, 35.02, 35.09
See application file for complete search history.

(56) References Cited

U.S. PATENT DOCUMENTS

| | | | |
|---|---|---|---|
| 5,179,926 A | 1/1993 | Ament | |
| 7,526,943 B2* | 5/2009 | Cubr et al. | 73/35.09 |
| 7,676,321 B2* | 3/2010 | Andri | 701/104 |
| 7,886,729 B2* | 2/2011 | Russell et al. | 123/636 |
| 8,214,130 B2* | 7/2012 | Andri | 701/104 |
| 8,352,156 B2* | 1/2013 | McDonald | 701/103 |
| 2007/0215130 A1* | 9/2007 | Shelby et al. | 123/637 |
| 2009/0276147 A1* | 11/2009 | Hamama et al. | 701/111 |
| 2010/0168991 A1* | 7/2010 | Hamama et al. | 701/111 |

* cited by examiner

*Primary Examiner* — John Kwon

(57) ABSTRACT

A knock detection system for an engine includes an intensity module, a knock threshold module, and a detection module. The intensity module determines an engine vibration intensity during a first period of engine operation. The knock threshold module determines a knock threshold based on an ethanol concentration in a fuel supplied to the engine. The detection module determines whether engine knock has occurred during the first period by comparing the knock threshold and the engine vibration intensity.

20 Claims, 7 Drawing Sheets

SYSTEM AND METHOD FOR KNOCK DETECTION BASED ON ETHANOL CONCENTRATION IN FUEL

CROSS-REFERENCE TO RELATED APPLICATIONS

This application claims the benefit of U.S. Provisional Application No. 61/378,576, filed on Aug. 31, 2010. The disclosure of the above application is incorporated herein by reference in its entirety.

FIELD

The present disclosure relates to systems and methods for detecting auto-ignition and knock in an engine, and more particularly, systems and methods for determining a knock control value used to detect the presence of engine knock.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Vehicles typically include an internal combustion engine that produces drive torque by combusting a mixture of air and fuel in cylinders of the engine. Combustion occurs within combustion chambers of cylinders. In spark-ignition engines, a spark plug supplies energy to the air-fuel mixture to initiate combustion. Once initiated, combustion continues along a flame front for a period.

Timing of the combustion may be generally controlled by spark timing. Spark timing may be controlled relative to a piston position and/or a crankshaft position. For example, the spark timing may be controlled relative to a top-dead-center (TDC) position of the pistons. At TDC, the volume of the combustion chamber is at its smallest volume.

Spontaneous combustion of a portion of the air-fuel mixture may occur when a pressure wave created by the spark-initiated combustion travels faster than the flame front. The pressure wave may result in a rapid pressure rise in end gases within the cylinders that causes the end gases to self-ignite (i.e., auto-ignite). Auto-ignition of the end gases may result in rapid combustion or detonation of the entire volume of end gases. Rapid combustion of the end gases results in a rapid release of heat that causes a rapid rise in cylinder pressure.

The rapid rise in cylinder pressure may cause the cylinder pressure to resonate at natural acoustic frequencies of the combustion chamber. Sustained oscillations of the pressure waves may cause metal surfaces of the combustion chamber to vibrate and produce an audible sound referred to as engine knock.

Engine control systems typically operate an engine near a knock limit for improved engine torque output and fuel economy. However, excessive engine knock can lead to undesirable audible noise and premature engine damage. Accordingly, some engine control systems include a knock detection system for detecting engine knock and initiating remedial action when engine knock is detected. Remedial action may be taken to control engine knock by lowering the knock intensity and/or inhibiting engine knock. For example, engine spark timing may be retarded to slow down the rate of combustion and thereby lower the knock intensity and/or prevent the occurrence of engine knock.

Generally, knock detection systems may be non-adaptive or adaptive. Non-adaptive knock detection systems detect engine knock based on predetermined background noise vibration. Adaptive knock detection systems detect engine knock based on background noise vibration measured during operation of the engine.

In various knock detection systems, engine knock may be detected when an intensity of the mechanical vibration within a predetermined frequency range is greater than a corresponding intensity of background noise vibration. Background noise vibration generally refers to mechanical vibration of the engine under no-knock conditions.

Several approaches have been developed to detect the occurrence of engine knock. In one approach, an accelerometer senses the mechanical vibration induced in the engine block structure as a result of the oscillating pressure wave in the combustion chamber. An energy of the mechanical vibration is used as an index of the intensity of the engine knock. In another approach, a pressure sensor senses cylinder pressure and thereby detects the oscillations in the cylinder pressure. Similar to the block structure vibration method, an energy of the pressure oscillations is used as an index of the knock intensity.

SUMMARY

In one form, the present disclosure provides a knock detection system for an engine that includes an intensity module, a knock threshold module, and a detection module. The intensity module determines an engine vibration intensity during a first period of engine operation. The knock threshold module determines a knock threshold based on an ethanol concentration in a fuel supplied to the engine. The detection module determines whether engine knock has occurred during the first period by comparing the knock threshold and the engine vibration intensity.

In a first exemplary knock detection system according to the present disclosure, the knock threshold module determines a correction value based on the ethanol concentration. The knock threshold module determines the knock threshold based on the correction value and a predetermined knock threshold.

In a second exemplary knock detection system according to the present disclosure, the knock detection system further includes a statistics module. The statistics module determines vibration intensity statistics based on engine vibration during a second period prior to the first period when the detection module has determined engine knock has not occurred. The knock threshold module further determines the knock threshold based on the vibration intensity statistics.

In related features, the vibration intensity statistics include an average value and a standard deviation value. In other related features, the knock threshold module determines a correction value based on a first ethanol concentration during the first period and a second ethanol concentration during the second period. The knock threshold module further determines the knock threshold based on the correction value. In yet other related features, the knock threshold module determines the correction value based on a difference between the first ethanol concentration and the second ethanol concentration.

In further features, the statistics module periodically updates the vibration intensity statistics based on engine vibration during second periods when the detection module has determined engine knock has not occurred. The statistics module refrains from updating the vibration intensity statistics when a change in the ethanol concentration is greater than a predetermined change. The knock threshold module further determines the knock threshold on the vibration intensity statistics.

In still further features, the statistics module selectively updates a vibration intensity profile when a change in the ethanol concentration is less than a predetermined change. The knock threshold module further determines the knock threshold based on the vibration intensity profile. In related features, the knock detection system includes an ethanol module and a diagnostic module. The ethanol module outputs an ethanol signal indicative of the ethanol concentration. The diagnostic module detects an error in the ethanol signal. The statistics module selectively updates an ethanol concentration value of the vibration intensity profile to a predetermined value based on the error.

In yet further features, the first period corresponds to a knock window of a cylinder of the engine and at least one of a duration and a phase of the knock window is based on the ethanol concentration.

In another form, the present disclosure provides a method for an engine. The method includes determining an engine vibration intensity during a first period of engine operation and determining a knock threshold based on an ethanol concentration in a fuel supplied to the engine. The method further includes determining whether engine knock has occurred during the first period by comparing the knock threshold and the engine vibration intensity.

In a first exemplary method according to the present disclosure, the determining the knock threshold includes determining a correction value based on the ethanol concentration. The determining the knock threshold further includes determining the knock threshold based on the correction value and a predetermined knock threshold.

In a second exemplary method according to the present disclosure, the method further includes determining vibration intensity statistics based on engine vibration during a second period prior to the first period when engine knock has not occurred. The determining the knock threshold further includes determining the knock threshold based on the vibration intensity statistics.

In related features, the vibration intensity statistics include an average value and a standard deviation value. In other related features, the determining the knock threshold includes determining a correction value based on a first ethanol concentration during the first period and a second ethanol concentration during the second period. The determining the knock threshold further includes determining the knock threshold based on the correction value. In yet other related features, the determining the correction value includes determining the correction value based on a difference between the first ethanol concentration and the second ethanol concentration.

In further features, the second exemplary method further includes periodically updating vibration intensity statistics based on engine vibration during second periods when engine knock has not occurred. The second exemplary method further includes refraining from updating the vibration intensity statistics when a change in the ethanol concentration is greater than a predetermined change. The determining the knock threshold further includes determining the knock threshold based on the vibration intensity statistics.

In still further features, the second exemplary method further includes selectively updating a vibration intensity profile when a change in the ethanol concentration is less than a predetermined change. The determining the knock threshold further includes determining the knock threshold based on the vibration intensity profile. In related features, the second exemplary method further includes outputting an ethanol signal indicative of the ethanol concentration, detecting an error in the ethanol signal, and selectively updating an ethanol concentration value to a predetermined value based on the error.

In yet further features, a method according to the present disclosure further includes determining a knock window of a cylinder of the engine based on the ethanol concentration. At least one of a duration and a phase of the knock window is based on the ethanol concentration and the first period corresponds to the knock window.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
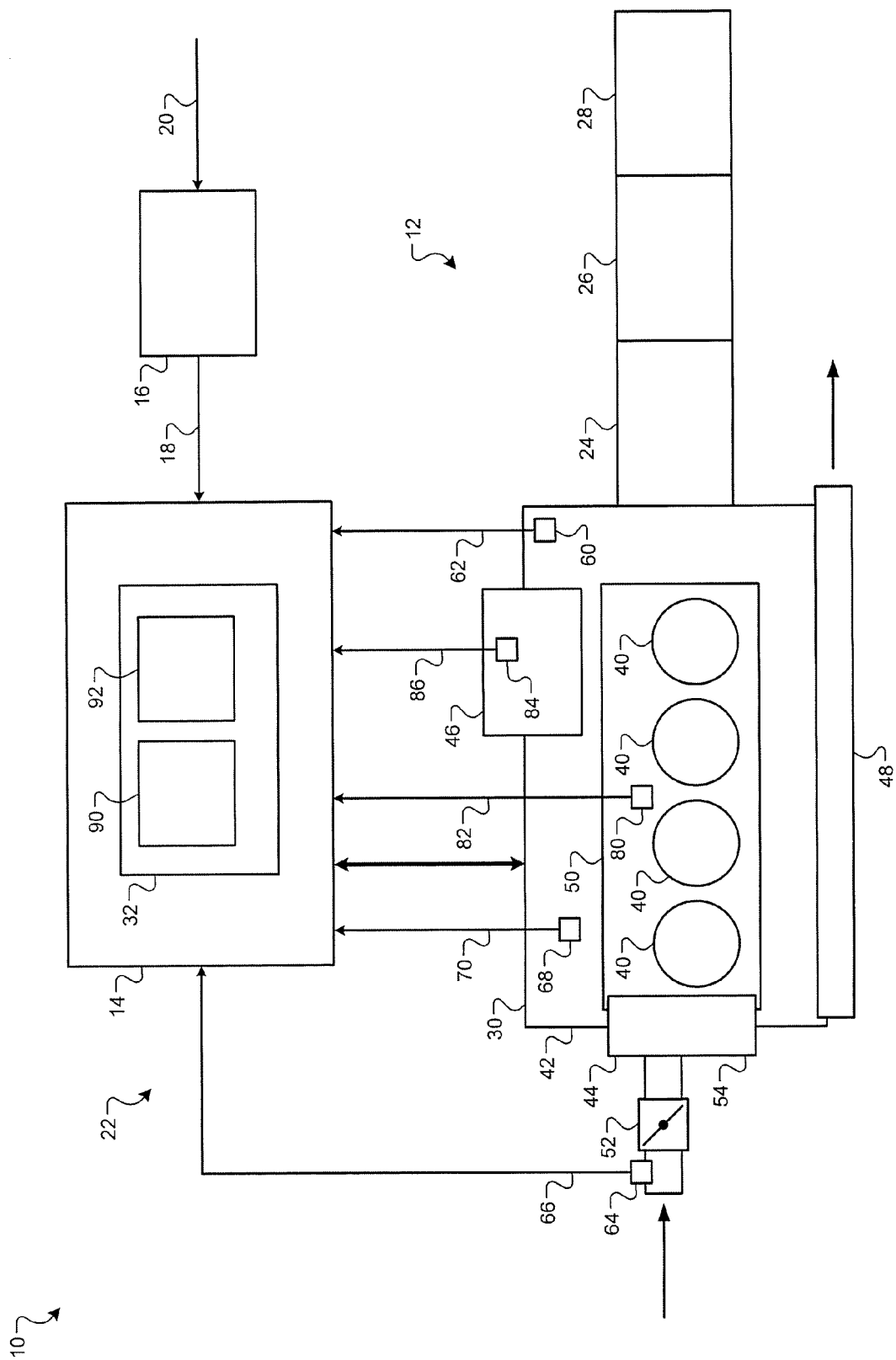
FIG. 1 is a functional block diagram illustrating an exemplary vehicle system according to the present disclosure.

The following description is merely illustrative in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Generally, background noise vibration varies with engine load. The background noise vibration for a given engine load also varies based on fuel composition. For example, the background noise vibration varies based on a concentration of ethanol in the fuel combusted by the engine. Since fuels of varying ethanol concentrations are commercially available, the ethanol concentration of the fuel combusted by the engine may vary after refueling the vehicle. Variation in ethanol concentration can result in the false detection of engine knock or a failure to detect engine knock in both non-adaptive and adaptive knock detection systems.

In non-adaptive knock detection systems, errors can result during periods when the ethanol concentration is different than a predetermined ethanol concentration used to determine the predetermined background noise vibration. In an adaptive knock detection system, errors can result during a transition period following a refueling event when the new fuel is mixing with the old fuel in the fuel tank and the ethanol concentration of the fuel supplied to the engine is changing. Over time, the errors may gradually decrease as the ethanol concentration stabilizes and new background noise vibration at the new ethanol concentration is measured. However, a lengthy period may be required for determining new background noise vibration for various engine loads.

Accordingly, the present disclosure provides exemplary systems and methods for improved detection of engine knock based on an ethanol concentration in the fuel provided to the engine. The present disclosure provides exemplary non-adaptive and adaptive knock detection systems. Both systems detect engine knock based on a comparison of an intensity of the mechanical vibration and a knock control value that is based on the ethanol concentration. In the exemplary systems, the knock control value is a knock threshold. Engine knock is detected when the intensity of the mechanical vibration is greater than the knock threshold.

The non-adaptive knock detection system monitors the ethanol concentration and determines the knock control value by applying a correction value to a predetermined knock control value. The correction value is based on the ethanol concentration. The adaptive knock detection system monitors the ethanol concentration and a stability of the ethanol concentration. The knock control value is determined by applying a correction value to background noise vibration data stored in memory. The background noise vibration data is periodically updated based on new vibration data obtained during periods when the ethanol concentration is stable. The correction value is based on a difference between a current ethanol concentration and a previous ethanol concentration during the periods the new vibration data was obtained.

The correction value provides an adjustment for changing ethanol concentration during periods when the ethanol concentration is unstable. The correction value decreases as the ethanol concentration stabilizes and the background noise vibration data is updated again at the new ethanol concentration. During periods when the ethanol concentration is stable, the correction value further provides an adjustment for a difference between a current ethanol concentration and a previous, stable ethanol concentration at which the new vibration data was obtained.

With particular reference to FIG. 1, an exemplary vehicle system 10 for a vehicle according to the present disclosure is presented. The vehicle system 10 includes a powertrain 12, a control module 14, and driver interface devices 16. Generally, the powertrain 12 produces drive torque and propels the vehicle. The control module 14 controls operation of the powertrain 12, including the drive torque produced. The control module 14 controls operation based on various inputs, including driver signals 18 output by the driver interface devices 16 and various other vehicle system signals and control values according to the present disclosure.

The driver interface devices 16 output the driver signals 18 in response to driver inputs 20 made by the driver. The driver inputs 20 may include, but are not limited to, manipulating an accelerator pedal, a brake pedal, and/or a steering wheel. The vehicle system signals include, but are not limited to, signals output by sensors that sense various vehicle operating parameters, and control signals generated by various modules of the vehicle system 10.

The powertrain 12 includes an engine system 22, a transmission 24, and a driveline 26. The engine system 22 produces the drive torque, which is transmitted to the transmission 24. Drive torque input to the transmission 24 is transmitted at one or more gear ratios to the driveline 26, which drives one or more wheels 28. The present disclosure is not limited to transmissions or drivelines of a particular type. For example, the transmission 24 may be an automatic transmission or a manual transmission. The driveline 26 may be configured to drive one or more front and/or rear wheels 28.

The engine system 22 includes an internal combustion engine (ICE) 30 and an engine control module (ECM) 32. The engine system 22 may be a hybrid engine system including an electric motor (not shown) that produces drive torque used alone, or in combination with, drive torque produced by the ICE 30. The present disclosure is not limited to internal combustion engines of a particular type or configuration.

For example, the ICE 30 may be a spark-ignition (SI) engine or a compression ignition (CI) engine. The ICE 30 may be a four-stroke engine or a two-stroke engine. The ICE 30 may have a V-type configuration or an in-line configuration. For exemplary purposes, the ICE 30 is presented as an in-line, four-stroke, reciprocating-type, spark-ignition engine having four cylinders 40. While the four cylinders 40 are presented, it will be appreciated that the ICE 30 may have fewer or additional cylinders.

The ICE 30 includes a block structure 42 defining the cylinders 40, an intake system 44, a fuel system 46, and an exhaust system 48. The block structure 42 supports the various components of the ICE 30 and includes at least one cylinder bank 50. Each cylinder bank 50 defines one or more of the cylinders 40. For simplicity, a single cylinder bank 50 defining all four of the cylinders 40 is presented. The intake system 44 controls a mass air flow (MAF) of intake air entering the ICE 30 and distributes the air to the cylinders 40. The intake system 44 may include a throttle 52 that controls the MAF and an intake manifold 54 that distributes the air to the cylinders 40. The fuel system 46 supplies fuel to the ICE 30 and controls a timing and an amount of fuel delivered to each of the cylinders 40. The fuel system 46 may include a fuel tank assembly (not shown) that contains the fuel and one or more fuel injectors (not shown) that meter the fuel delivered to the cylinders 40.

During operation of the ICE 30, air is drawn into the cylinders 40 through the throttle 52 and the intake manifold 54 and mixes with fuel supplied by the fuel system 46. The air-fuel (A/F) mixtures are compressed by pistons (not shown) and combusted in the cylinders 40. Combustion of the A/F mixtures drives the pistons within the cylinders 40. Reciprocating motion of the pistons drives a crankshaft (not shown) and thereby produces the drive torque. Exhaust produced by the combustion is forced out of the cylinders 40 by the pistons into the exhaust system 48. The exhaust system 48 receives the exhaust and may treat the exhaust to reduce concentrations of various gases in the exhaust before the exhaust exits to the surroundings.

The ECM 32 regulates the drive torque produced by the ICE 30 based on inputs from various vehicle signals, including the driver signals 18 and signals of various sensors. The sensors may include an engine speed sensor 60 that senses a rotational speed of the ICE 30 (engine speed) and outputs an engine speed signal 62 indicative of the engine speed sensed. The engine speed sensor 60 may sense the engine speed by sensing a rotational position of the crankshaft (crankshaft position).

The sensors may also include a MAF sensor 64 that senses a MAF of the intake air and outputs a MAF signal 66 indicative of the MAF sensed. Other sensors 68 may sense other engine operating parameters and output other sensor signals 70 indicative of the parameter sensed. The other sensors 68 may include, for example, an intake air temperature (IAT) sensor, a manifold absolute pressure (MAP) sensor, an engine coolant temperature (ECT) sensor, and an oil temperature (OT) sensor.

The ECM 32 may also form part of a knock detection and control system. In this capacity, the ECM 32 detects the occurrence of engine knock and selectively initiates remedial action to control engine knock by reducing the intensity and/or occurrence of engine knock. According to the present disclosure, the ECM 32 detects the occurrence of engine knock based on measured mechanical vibration of the ICE 30 and an ethanol concentration of the fuel supplied to the ICE 30. The ECM 32 further detects the occurrence of engine knock based on engine load.

One or more vibration sensors coupled to the block structure 42 may be used to measure the mechanical vibration. For example, one or more vibration sensors may be coupled to each cylinder bank. In the present example, a single vibration sensor 80 coupled to the cylinder bank 50 is provided. The vibration sensor 80 may be coupled to the cylinder bank 50 at a central location proximate the cylinders 40 as shown. The present disclosure is not limited to a particular vibration sensor and the vibration sensor 80 may, for example, include a piezoelectric accelerometer. The vibration sensor 80 outputs a vibration signal 82 based on the measured mechanical vibration.

An ethanol sensor 84 in communication with the fuel supplied to the cylinders 40 may measure the ethanol concentration in the fuel. More specifically, the ethanol sensor 84 may measure a proportion of ethanol to gasoline in the fuel. The proportion may represent a volume percent of ethanol to gasoline. The ethanol sensor 84 may be located in a fuel supply line (not shown) of the fuel system 46. The present disclosure is not limited to a particular ethanol sensor and the ethanol sensor may, for example, measure the ethanol concentration by measuring a resistivity of the fuel. The ethanol sensor 84 outputs a fuel composition signal 86 indicative of the ethanol concentration measured. The fuel composition signal 86 may be a voltage signal output in response to the resistivity measured. Although referred to as a sensor, the ethanol sensor 84 may also be referred to as an ethanol module.

In alternate implementations without an ethanol sensor, the ECM 32 may estimate the ethanol concentration based on one or more engine operating parameters. For example, a module (or modules) of the ECM 32, which may be referred to as an ethanol module, may estimate the ethanol concentration. The ethanol concentration may be estimated based on an A/F ratio required to operate the ICE 30 at a stoichiometric A/F ratio. At stoichiometric A/F ratios, complete combustion of the fuel may occur. Stoichiometric A/F ratios vary with fuel composition. For example, the stoichiometric A/F ratio for gasoline is around fourteen point seven to one (14.7:1). Fuel containing a mixture of gasoline and ethanol generally will have a stoichiometric A/F ratio that is lower that that of gasoline.

Under various conditions, the ECM 32 may operate the ICE 30 at a stoichiometric A/F ratio. The ECM 32 may adjust the amount of air and fuel provided to the ICE 30 to achieve stoichiometric A/F ratios. The ECM 32 may estimate the ethanol concentration based on actual A/F ratios required to achieve the stoichiometric A/F ratios.

The engine load may be estimated based on various operating conditions of the engine including, but not limited to engine speed and an amount of air entering the cylinders 40, such as an amount of air per cylinder (APC). The APC may be determined based on the engine speed and the MAF.

In various implementations, the ECM 32 may include a knock sensing module 90 that communicates with a knock control module 92. The knock sensing module 90 detects the occurrence of engine knock based on various vehicle system signals. The vehicle system signals include, but are not limited to, the outputs of the vibration sensor 80, the ethanol sensor 84, the engine speed sensor 60, and the MAF sensor 64. The knockسensing module 90 may communicate whether engine knock is occurring to the knock control module 92. The knock control module 92 may initiate remedial action to control the engine knock. For example, the knock control module 92 may provide an instruction to retard spark timing to control the engine knock.

Figure 2:
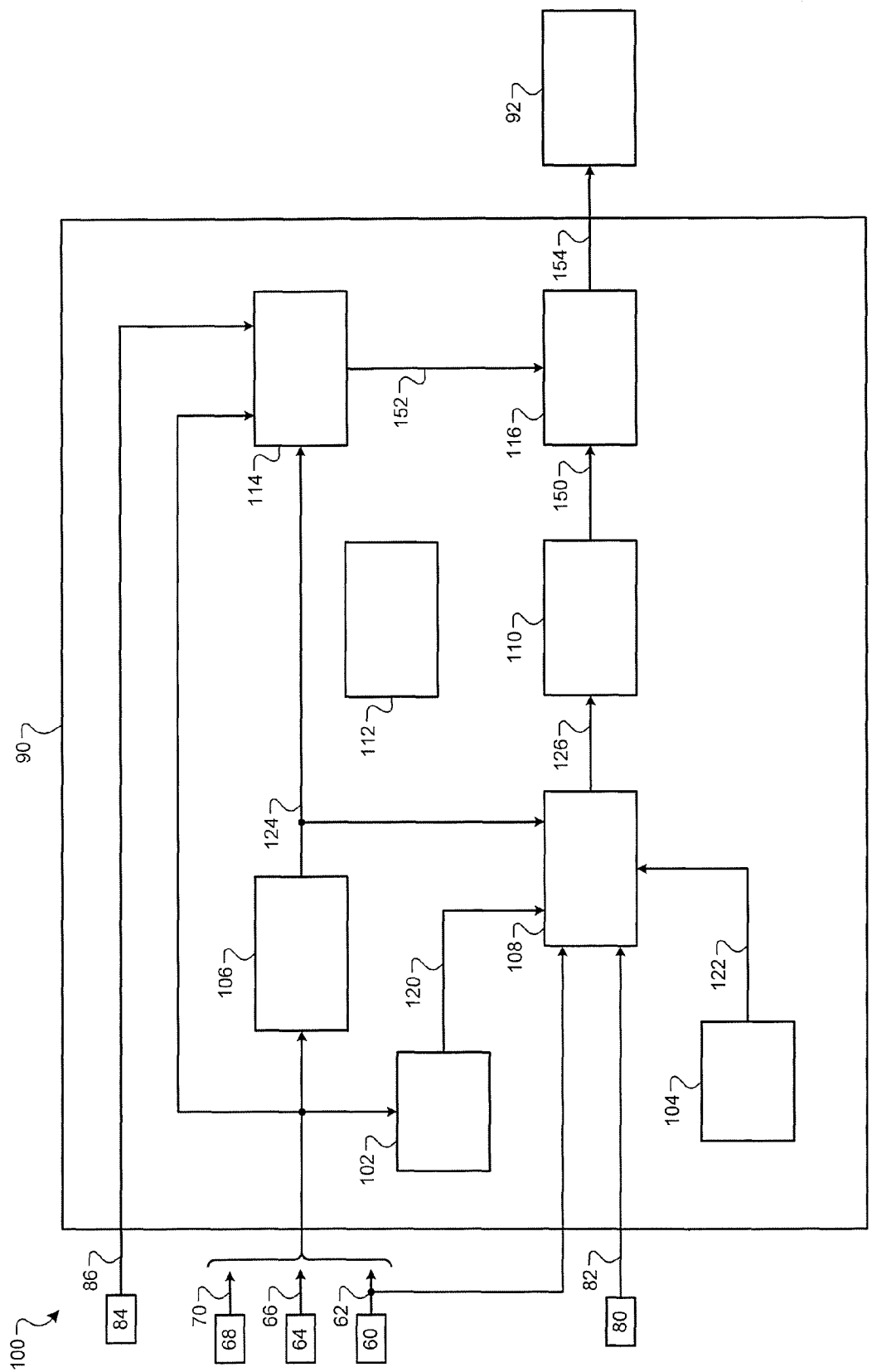
FIG. 2 is a functional block diagram illustrating an exemplary knock detection system according to the present disclosure.

With particular reference to FIG. 2, an exemplary implementation of the knock sensing module 90 is presented for a non-adaptive knock detection system 100 according to the present disclosure. The knock sensing module 90 detects the occurrence of engine knock in one or more of the cylinders 40. In various implementations, the knock sensing module 90 may detect engine knock on a cylinder-by-cylinder basis, a bank-by-bank basis, an engine cycle-by-cycle basis, a combination thereof, or other basis. As used herein, an engine cycle refers to a cycle in which all of the cylinders 40 have completed a single combustion cycle. For simplicity of the following description, the knock sensing module 90 will generally be described as detecting knock on a cylinder-by-cylinder basis.

The knock sensing module 90 includes a cylinder identification (CID) module 102, a selection module 104, a load module 106, a vibration data module 108, an intensity module 110, a memory module 112, a knock threshold module 114, and a detection module 116. The CID module 102 identifies a next cylinder of the cylinders 40 to experience a TDC event and informs the vibration data module 108 of the next cylinder via a cylinder ID signal 120. A TDC event occurs when a piston within the cylinders 40 reaches a corresponding TDC position within the cylinder.

In the present example where the ICE 30 includes four cylinders 40, TDC events for the cylinders 40 may occur every ninety degrees (90°). For example, the TDC events may occur at crankshaft positions of zero degrees (0°), ninety degrees (90°), one hundred and eighty degrees (180°), and two hundred and seventy degrees (270°). Accordingly, the CID module 102 may identify the next cylinder based on crankshaft position, which the CID module 102 may determine based on the engine speed signal 62.

The selection module 104 selects a next cylinder of the cylinders 40 to be evaluated for knock. The next cylinder to be evaluated may be the next cylinder to experience a TDC event. The selection module 104 identifies the selected cylinder to the vibration data module 108 via a selection signal 122. In alternative implementations, the selection module 104 may select a bank of cylinders to be evaluated for knock. Thus, in various implementations, the selection module 104 determines the selected cylinders based on whether engine knock is to be evaluated on a cylinder-by-cylinder basis, a bank-by-bank basis, an engine cycle-by-cycle basis, or other basis.

The load module 106 determines a current engine load zone and communicates the current engine load zone to the knock threshold module 114 via a load zone signal 124. Engine load zones may be based on predetermined engine speed ranges and predetermined engine load ranges. For example, there may be M times N predetermined engine load zones, where M represents a number of mutually exclusive engine speed ranges and N represents a number of mutually exclusive engine load ranges. In various implementations, seventeen (17) engine speed ranges and four (4) engine load ranges may be provided.

In various implementations, the load module 106 estimates the current engine load based on the current APC. The load module 106 receives the signals 62, 66 output by the engine speed sensor 60 and the MAF sensor 64. The load module 106 may also receive one or more of the other sensor signals 70 output by the other sensors 68 as shown.

The vibration data module 108 receives the vibration signal 82 output by the vibration sensor 80 and the cylinder information output by the CID module 102 and the selection module 104. Based on the information received, the vibration data module 108 generates a vibration data signal 126 including vibration data used by the intensity module 110 to determine a raw knock intensity for the cylinder selected for evaluation. Generally, the raw knock intensity is a measure of an intensity of the mechanical vibration within a frequency range or frequency ranges in which engine knock vibration are expected to occur.

More than one frequency range may be used to determine the raw knock intensity. The frequency range or ranges used may vary based on engine speed. Each frequency range may be further divided into frequency bins. For example, each frequency range may be divided into four hundred hertz (400 Hz) frequency bins. The raw knock intensity may represent a peak intensity within a single frequency bin or an average intensity of the frequency bins within a particular frequency range or ranges.

In various implementations, the vibration data is obtained from vibration information within a knock window corresponding to a period within the combustion cycle of the selected cylinder when engine knock may occur. The knock windows for each of the cylinders 40 may be defined in degrees of crankshaft rotation relative to the TDC events of the cylinders 40. A duration and/or phase of the knock windows relative to the TDC events may vary based on one or more engine operating conditions. For example, the duration and/or phase may be a function of engine speed, engine load, spark timing, and/or fuel composition. Accordingly, the vibration data module 108 may receive various other vehicle system signals including, but not limited to the signals 62, 124, 86 output by the engine speed sensor 60, the load module 106, and the ethanol sensor 84.

Figure 3:
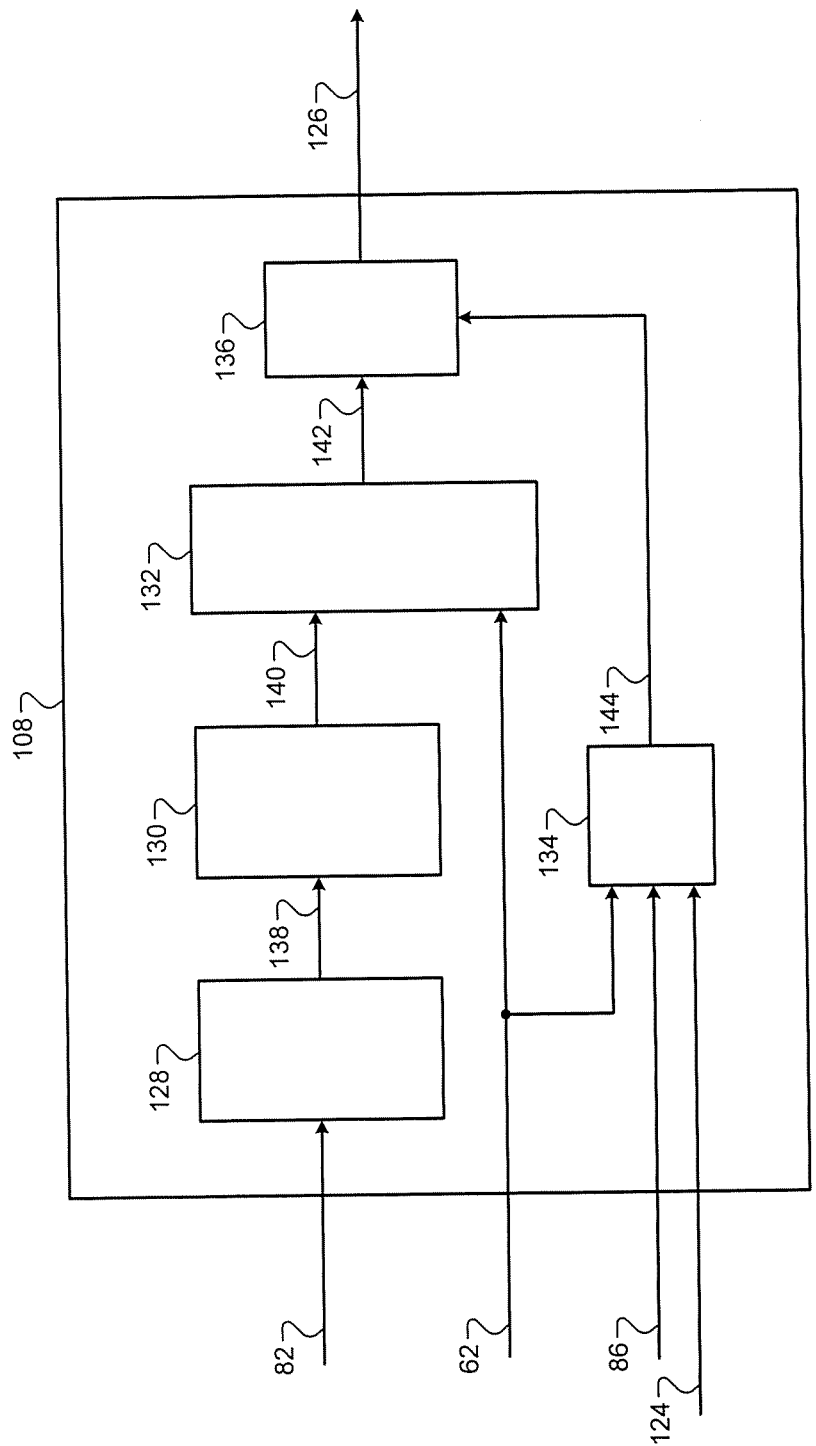
FIG. 3 is a functional block diagram illustrating an exemplary implementation of the vibration data module shown in FIG. 2 according to the present disclosure.

With particular reference to FIG. 3, an exemplary implementation of the vibration data module 108 includes an analog front-end 128, an analog-to-digital (A/D) converter 130, a digital signal processing (DSP) module 132, a window module 134, and a data module 136. The analog front-end 128 receives the vibration signal 82 output by the vibration sensor 80 and generates an analog signal 138 based on the vibration signal 82. In alternate implementations including more than one vibration sensor, the analog front-end 128 may receive the outputs of other vibration sensors and generate the analog signal 138 based on the outputs of one or more selected vibration sensors. The vibration sensors may be selected based on the particular cylinder and/or bank being evaluated for engine knock. For example, the vibration sensor or sensors closest to the cylinder or bank being evaluated may be selected.

The analog front-end 128 may include one or more modules that work together to perform various analog signal processing functions used to generate the analog signal 138. In various implementations, the analog front-end 128 may include a differential input circuit, an analog filter, and/or a gain/attenuation module. The differential input circuit may convert a differential input of the vibration signal 82 into a single-ended output. The analog filter may filter the vibration signal 82. For example, the analog filter may be a first-order filter with a predetermined low-pass cutoff frequency of around twenty five hertz (25 Hz). The gain/attenuation module may be an automatic gain control module.

The ND converter 130 receives the analog signal 138 of the analog front-end 128 and generates a digital signal 140 based on the analog signal 138. The digital signal 140 is a digitized version of the analog input of the analog signal 138. The A/D converter 130 may have a resolution of around ten (10) bits or more.

The DSP module 132 includes one or more modules that work together to perform various digital signal processing functions used to generate a signal 142 based on the analog signal 138. In various implementations, the DSP module 132 may perform a digital decimation function and may remove DC bias. The DSP module 132 may perform a filtering function. In an exemplary implementation, the DSP module 132 may implement a fourth-order elliptic infinite impulse response (IIR) filter. The IIR filter may have a predetermined cutoff frequency of around twenty hertz (20 Hz). Alternately, the DSP module 132 may implement two second-order IIR filters in series to improve stability.

The window module 134 determines the knock window for the selected cylinder based on the current engine operating conditions. The window module 134 communicates with the knock window via a signal 144. The window module 134 may receive various vehicle system signals including, but not limited to the signals 62, 86, 124 generated by the engine speed sensor 60, the MAF sensor 64, and the load module 106.

The data module 136 generates the vibration data communicated in the vibration data signal 126. In an exemplary implementation, the data module 136 transforms vibration information contained in the signal 142, which may correspond to a time domain, to vibration information corresponding to a frequency domain that includes the vibration data. The data module 136 performs at least one fast Fourier transform (FFT) calculation for the knock window. The FFT calculation includes a number (F) of points within segments of the signal 142 corresponding to the knock window. The number F may be predetermined and may, for example, range from around one hundred and twenty eight (128) points to around five hundred (500) points.

Depending on the duration of the knock window, the data module 136 may calculate multiple FFTs. If the last FFT is partially completed when the knock window ends, the last FFT may be zero-padded. The data module 136 may aggregate multiple FFTs point by point, or frequency bin by frequency bin. For each frequency bin, the maximum value or an average value across the FFTs may be selected for output. In various implementations, around one half of the FFT frequency bins are ignored because of aliasing.

The intensity module 110 determines a single raw knock intensity for the selected cylinder based on the vibration data output by the vibration data module 108. The raw knock intensity may be determined from one or more of the FFT points of the vibration data. The intensity module 110 communicates the raw knock intensity to the detection module 116 via a raw knock intensity signal 150.

The memory module 112 includes nonvolatile memory where a memory table including predetermined knock control values are stored for retrieval based on at least ethanol concentration. The nonvolatile memory preserves the predetermined knock control values during periods when the ICE 30 is not operating and/or power is not supplied to the memory module 112. The nonvolatile memory may include, for example, flash memory (including NAND and NOR flash memory), phase change memory, magnetic RAM, and/or multistate memory.

In various implementations, the memory module 112 may include additional memory tables where the predetermined knock control values are stored based on other engine operating parameters such as, for example, engine speed and engine load. According to the present example, predetermined knock control values are stored in the memory tables based on ethanol concentration and engine load zone. The memory tables are further indexed by cylinder.

The knock threshold module 114 determines a knock control value for the selected cylinder based on various engine operating parameters, including at least ethanol concentration and engine load. The knock threshold module 114 communicates the knock control value to the detection module 116 via a knock control value signal 152. In an exemplary implementation, the knock threshold module 114 obtains the knock control value from memory tables within the memory module 112 based on the current ethanol concentration and the current engine load zone. The memory tables include predetermined knock control values for a predetermined number (E) of mutually exclusive ethanol concentration ranges and the M×N predetermined engine load zones. For example, the memory tables may include predetermined knock control values for nine (9) ethanol concentration ranges (i.e., E=9). The memory tables may be further indexed by cylinder.

In an alternate implementation, the knock threshold module 114 obtains a correction value from memory tables of the memory module 112 based on the current ethanol concentration and the current engine load zone. The knock threshold module 114 may determine the knock control value by applying the correction value to a predetermined knock control value that may also be stored in memory tables of the memory module 112 and retrieved by the knock threshold module 114. For example, the correction value may be a gain and the knock control value may be calculated as a product of the predetermined knock control value and the gain.

The correction value may be based on a difference between the current ethanol concentration and a predetermined ethanol concentration. The memory tables may include predetermined correction values for a predetermined number (D) of mutually exclusive difference ranges. For example, nine (9) predetermined difference ranges may be provided.

The detection module 116 detects the occurrence of engine knock by comparing the knock control value and the raw knock intensity for the selected cylinder. The detection module 116 may detect engine knock is occurring when the raw knock intensity is greater than the knock control value. The detection module 116 informs the knock control module 92 whether engine knock is occurring via a knock detection signal 154. The detection module 116 may further communicate the raw knock intensity to the knock control module 92.

In various implementations, the vibration data module 108 may include a second analog front-end, a second A/D converter, and a second DSP module to separately process two or more vibration sensor signals. In this way, the data module 136 may separately calculate FFTs for the knock window of one cylinder that overlaps with the knock window of another cylinder.

Figure 4:
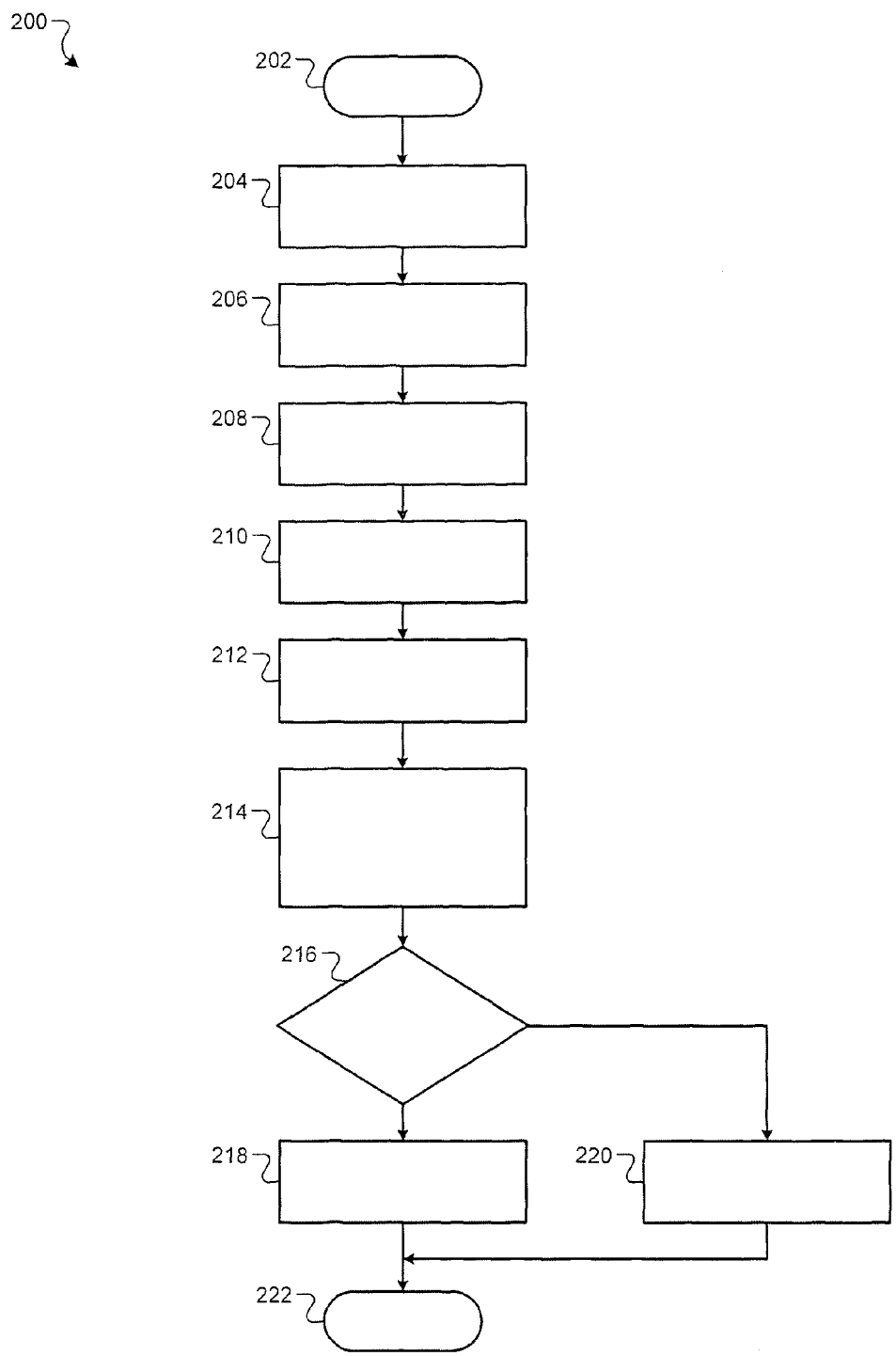
FIG. 4 is a flow chart illustrating an exemplary method for detecting engine knock according to the present disclosure.

With particular reference to FIG. 4, a flow chart illustrating an exemplary method 200 for detecting engine knock according to the present disclosure is presented. The method 200 may be implemented in one or more modules of a knock detection system, such as the knock detection system 100 discussed above. Accordingly, the method 200 will be described with reference to the various modules of the knock detection system 100. In this way, the operation of the knock detection system 100 may also be more fully understood.

A start of the method 200 is designated by reference numeral 202. Control begins at 204 where the selection module 104 selects the cylinder (or cylinders) to be evaluated for knock. At 206, the vibration data module 108 generates the vibration data for the selected cylinder. At 208, the intensity module 110 determines the raw knock intensity for the selected cylinder. At 210, the load module 106 determines the engine load zone within which the selected cylinder is operated. At 212, the knock threshold module 114 obtains the ethanol concentration of the fuel supplied to the selected cylinder.

At 214, the knock threshold module 114 determines the knock control value for the selected cylinder. In an exemplary implementation, the knock threshold module 114 retrieves the predetermined knock control value and the correction value from the corresponding tables of the memory module 112. The knock threshold module 114 determines the knock control value by calculating a product of the predetermined knock control value and the correction value.

At 216, the detection module 116 determines whether the raw knock intensity is greater than the knock control value. If yes, then control proceeds at 218, otherwise control proceeds at 220. At 218, the detection module 116 informs the knock control module 92 that engine knock is detected in the selected cylinder. Alternately, at 220, the detection module 116 informs the knock control module 92 that engine knock is not detected in the selected cylinder. From one of 218 and 220, control returns to the start at 202 to begin another loop in the method for the next cylinder to be evaluated for engine knock. The return to start is indicated at 222.

Figure 5:
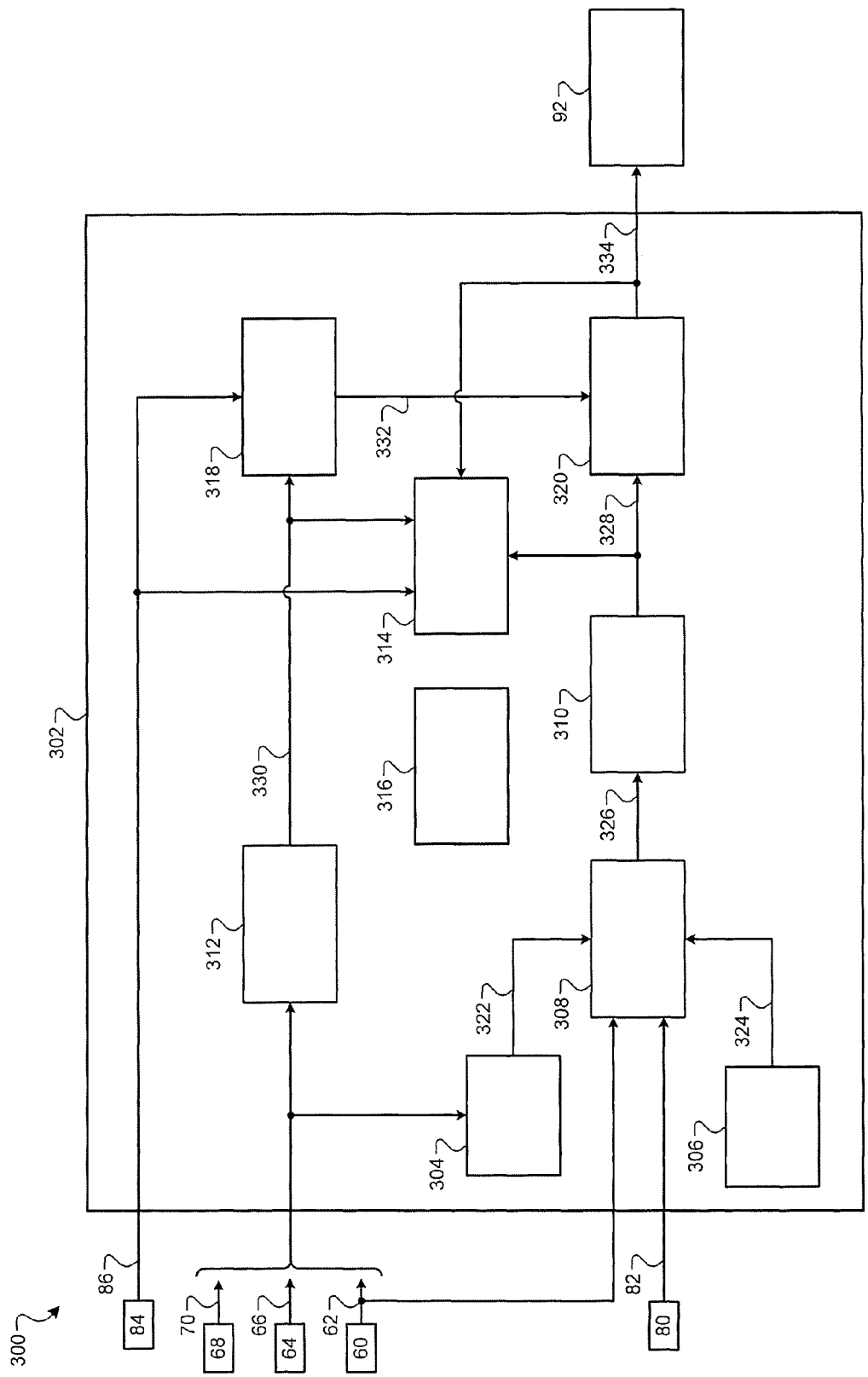
FIG. 5 is a functional block diagram illustrating another exemplary knock detection system according to the present disclosure.

With particular reference to FIG. 5, an exemplary adaptive knock detection system 300 including a knock sensing module 302 according to the present disclosure is presented. The knock sensing module 302 selectively updates background noise vibration profiles for predetermined engine load zones based on background noise vibration data obtained for selected cylinders. The background noise vibration profiles are further updated based on an ethanol concentration during a period the background noise vibration data was obtained. The background noise vibration data used to update the background noise vibration profiles is obtained during periods when the ethanol concentration of the fuel is stable and engine knock is not detected.

The knock sensing module 302 further determines a knock control value based on a difference between a current ethanol concentration and a learned ethanol concentration associated with the corresponding background noise vibration profile. The knock sensing module 302 further determines the knock control value based on whether a current ethanol concentration is stable. The knock sensing module 302 detects the occurrence of engine knock when a raw knock intensity of the engine vibration is greater than the knock control value. Similar to the knock sensing module 90, the knock sensing module 302 may detect engine knock on a cylinder-by-cylinder, a bank-by-bank, an engine cycle-by-cycle, a combination thereof, or other basis. For simplicity, the knock sensing module 302 will generally be described as detecting knock on a cylinder-by-cylinder basis.

The knock sensing module 302 includes a CID module 304, a selection module 306, a vibration data module 308, an intensity module 310, and a speed/load module 312. The knock sensing module 302 further includes a statistics module 314, a memory module 316, a knock threshold module 318, and a detection module 320. The CID module 304, the selection module 306, and the vibration data module 308 work together to generate vibration data for cylinders selected for evaluation. The CID module 304, the selection module 306, and the vibration data module 308 may be substantially similar in structure and function as the CID module 102, the selection module 104, and the vibration data module 108, respectfully. Accordingly, these modules will be briefly discussed.

The CID module 304 identifies a next cylinder of the cylinders 40 to experience a TDC event and informs the vibration data module 308 of the next cylinder via a cylinder ID signal 322. The CID module 304 may determine the next cylinder based on crankshaft position, which the CID module 304 may determine based on the engine speed signal 62.

The selection module 306 identifies a next cylinder to be evaluated for knock and informs the vibration data module 308 of the selected cylinder via a selection signal 324. The vibration data module 308 generates a vibration data signal 326 including vibration data for the selected cylinder that is used by the intensity module 310 to determine a raw knock intensity for the selected cylinder. As discussed above, the vibration data is generated based on the vibration signal 82 and a knock window of the selected cylinder, which may be based on various engine operating conditions. The vibration data is obtained from at least one FFT calculation including a number (Q) of the number F of points for the knock window. The number Q may be predetermined and may, for example, be equal to F.

The intensity module 310 determines the raw knock intensity for the selected cylinder based on the vibration data output by the vibration data module 308. The intensity module 310 communicates the raw knock intensity to the statistics module 314 and the detection module 320 via a raw knock intensity signal 328.

The speed/load module 312 determines a current engine speed and a current engine load for the selected cylinder and communicates the current engine speed and load to the statistics module 314 and the knock threshold module 318 via a speed/load signal 330. The speed/load module 312 may estimate the current engine load based on the current APC. The speed/load module 312 may receive the signals 62, 66 output by the engine speed sensor 60 and the MAF sensor 64. The speed/load module 312 may also receive one or more of the other sensor signals 70 output by the other sensors 68 as shown.

The speed/load module 312 may further determine whether the current engine speed and load fall within one of predetermined engine load zones. As discussed above, there may be M times N predetermined engine load zones for each of the cylinders 40, where M represents a number of mutually exclusive engine speed ranges and N represents a number of mutually exclusive engine load ranges. If the current engine speed and load fall within one of the engine load zones, the speed/load module 312 may communicate the corresponding engine load zone via the speed/load signal 330.

The statistics module 314 selectively updates background noise vibration profiles for each of the predetermined engine load zones of each of the cylinders 40. The background noise vibration profiles may be stored in memory tables of the memory module 316. In an exemplary implementation, the background noise vibration profiles include vibration statistics including an average intensity and a standard deviation for each cylinder and engine load zone. The vibration statistics are stored in corresponding cells of background statistics tables. The background vibration noise profiles further include learned ethanol concentrations for each cylinder and engine load zone in cells of corresponding background ethanol concentration tables.

The statistics module 314 monitors the ethanol concentration and determines whether the current ethanol concentration is stable. The statistics module 314 may determine the current ethanol concentration is stable when a time rate of change in the ethanol concentration is less than a predetermined rate. For example, the predetermined rate may be around two percent per ten seconds (2%/10 sec), or around 0.2 percent per second (0.2%/sec).

In an exemplary implementation, the statistics module 314 may calculate a difference every predetermined control loop between a current ethanol concentration and a previous ethanol concentration. For example, the predetermined control loop may be around one hundred milliseconds (100 msec). The statistics module 314 may further calculate an integral of the difference and determine the current ethanol concentration is unstable based on a value of the integral. If the value of the integral is greater than a predetermined integral value within a predetermined number (C) of control loops, the current ethanol concentration may be deemed unstable. For example, the predetermined integral value may correspond to a change of around two percent (2%) and the number C may be around one hundred (100) control loops.

If the value of the integral remains less than the predetermined integral value for the predetermined number of control loops, the current ethanol concentration may be deemed stable. The statistics module 314 may implement a counter to track the number of control loops during periods when the value of the integral is being evaluated. The statistics module 314 may reset the counter when a determination is made to begin another period of evaluating the stability of the ethanol concentration.

During periods when the ethanol concentration is stable, the statistics module 314 enables a background noise learning process. The statistics module 314 also enables the background noise learning process when the ethanol concentration cannot be reliably obtained. During periods when the ethanol concentration can be reliably obtained but is not stable, the background noise learning process is disabled.

The ethanol concentration may not be reliably obtained when one or more sensors or modules malfunction. For example, the ethanol sensor 84 may malfunction, causing an error in the fuel composition signal 86. As another example, one or more other sensors or modules of the knock detection system 300 used to estimate the ethanol concentration may malfunction, causing errors in the estimate. Malfunctions and errors, such as an out-of-range error or a response error, may be detected by a diagnostic module or modules (not shown) that monitor operation, including the various vehicle system signals.

During the background noise learning process, the statistics module 314 calculates a new average intensity and a new standard deviation for a given background noise vibration profile after a number (P) of raw intensities for the cylinder and engine load zone have been determined. More specifically, the number P of raw intensities are raw intensities at which engine knock in the cylinder was not detected. The number P may be predetermined and may, for example, be between around one thousand (1000). Depending on the number P, the standard deviation may be calculated as a standard deviation of a population of raw intensities, or as a standard deviation of a sample of raw intensities.

The statistics module 314 may store the raw intensities for each cylinder and engine load zone that will be used to calculate the vibration statistics in the memory module 316. The raw intensities may be stored in corresponding cells of first background learning tables. The statistics module 314 may additionally store, in corresponding cells of second background learning tables, a learned ethanol concentration for each cylinder and engine load zone. If the ethanol concentration was reliably obtained during the period the raw intensities were obtained, the learned ethanol concentration may be an average of ethanol concentrations obtained during the respective periods each raw knock intensity was obtained.

If the background noise learning process was enabled as a result of a problem reliably obtaining the ethanol concentration, a predetermined default ethanol concentration may be stored as the learned ethanol concentration. The default ethanol concentration may correspond to an ethanol concentration that minimizes falsely detecting engine knock when engine knock is not occurring, yet ensures correctly detecting engine knock which may cause damage to the ICE 30. The default ethanol concentration may be predetermined through testing and/or analysis of the knock detection system 300.

Once the number P of raw intensities has been obtained and the vibration statistics have been calculated, the statistics module 314 updates the appropriate cells in the background statistics tables and the background ethanol concentration tables. Additionally, the statistics module 314 resets (i.e., clears) the corresponding cells of the first background learning tables. If the ethanol concentration becomes unstable during a background learning process, the background learning process is disabled and the statistics module 314 resets the cells in both the first and second background learning tables for all cylinders and engine load zones. Another background learning process is not initiated until the ethanol concentration is deemed stable again. In this way, the statistics module may begin to selectively update the background noise vibration profiles for each cylinder and engine load zone at the new stable ethanol concentration.

The memory module 316 includes non-volatile memory where various control values of the knock detection system 300 are stored for retrieval and/or use by various modules. The memory module 316 includes the first and second background learning tables and the tables containing the background noise vibration profiles for each of the cylinders 40. In an exemplary implementation, initial vibration profiles, including initial vibration statistics and ethanol concentrations are initially stored in the memory module 316. The initial values may be predetermined through testing, analysis, or a combination thereof, using a predetermined fuel composition. The predetermined fuel composition may be based on the commercially available fuels, including regular unleaded and E85 fuels. The initial values are used when the vehicle is started for the first time and until they are replaced by new background noise vibration profiles. In this way, the knock detection system 300 may detect engine knock while new background noise vibration profiles are determined.

The initial values may be restored and used again upon a manual reset of the memory module 316. A manual reset may be performed by a service technician or by a diagnostic process. A diagnostic process may perform a manual reset when the diagnostic process determines the stored values are unreliable. The stored values may be deemed unreliable when a problem is detected with one or more sensors or modules of the knock detection system 300, such as the vibration sensor 80, the ethanol sensor 84, or the statistics module 314. For example, one or more diagnostic modules may detect an error in the signal generated by a sensor or module, such as an out-of-range error or a response error.

The knock threshold module 318 determines a knock control value for the selected cylinder based on the current engine speed, the current engine load, the current ethanol concentration, and an expected vibration profile for the selected cylinder. When the current ethanol concentration cannot be reliably obtained, the knock threshold module 318 may use the predetermined default ethanol concentration as the current ethanol concentration. The knock threshold module 318 communicates the knock control value to the detection module 320 via a knock control value signal 332. The expected vibration profile is based on one or more of the background noise vibration profiles for the selected cylinder.

In various implementations, the predetermined engine speed and engine load ranges may include gaps. When the current engine speed and/or engine load fall within the gaps (i.e., do not fall within the corresponding predetermined ranges), the expected vibration profile may be determined through interpolation. More specifically, the expected vibration profile may be determined through interpolation based on the background noise vibration profiles of the nearest engine load zones.

For example, where only the current engine speed (or the current engine load) falls within a gap, the expected vibration profile may be determined through interpolation based on the background noise vibration profiles of the nearest two engine load zones. If both the current engine speed and load fall within gaps, the expected vibration profile may be determined through interpolation based on the background noise vibration profiles of the nearest four engine load zones.

In alternate implementations where there are no gaps in the engine speed or load ranges, the expected vibration profile may be based on the background noise vibration profile for the engine load zone within which the current engine speed and load fall.

In an exemplary implementation, the knock threshold module 318 determines the knock control value based on a difference between the current ethanol concentration and one or more of the learned ethanol concentrations. In an exemplary implementation, when the difference is greater than a predetermined difference, the knock threshold module 318 applies a gain when determining the expected vibration profile. The gain may be applied to the average intensity and/or the standard deviation of the background noise vibration profiles of one or more engine load zones. The gain may be based on the difference and may be a predetermined number obtained from a memory table of the memory module 316 based on the difference. For example, the gains may be real number scalar values greater than one (1.0) applied through multiplication. The gains may be stored in gain tables of the memory module 316.

In an exemplary implementation where there are gaps in the engine load zones, the knock threshold module 318 calculates a difference between the current ethanol concentration and each of the learned ethanol concentrations of the nearest engine load zones. The knock threshold module 318 determines an expected vibration profile for each of the nearest engine load zones by applying a gain to each of the corresponding background noise vibration profiles. The gain applied to each is based on the difference for the particular engine load zone. It will be appreciated that the gain applied to each engine load zone may be different, since the learned ethanol concentration stored for each engine load zone may be different. The knock threshold module 318 then determines a single overall expected average intensity and a single overall standard deviation by interpolating between the corresponding values of the expected vibration profiles. The knock control value may then be calculated by determining a sum of the overall expected average intensity and a product of a predetermined number (S) and the overall standard deviation.

In an exemplary implementation with no gaps, the knock threshold module 318 calculates a difference between the current ethanol concentration and the learned ethanol concentration of the engine load zone within which the current engine speed and load fall. The knock threshold module 318 determines a gain based on the difference and applies the gain to the average intensity and the standard deviation of the corresponding background noise vibration profile. The knock control value may then be calculated by determining a sum of the gain adjusted average intensity and a product of a predetermined number (S) and the gain adjusted standard deviation.

The detection module 320 detects the occurrence of engine knock by comparing the knock control value and the raw knock intensity for the selected cylinder. In an exemplary implementation, the detection module 320 detects engine knock is occurring when the raw knock intensity is greater than the knock control value. The detection module determines engine knock is not occurring when the raw knock intensity is less than or equal to the knock control value. The detection module 320 informs the knock control module 92 and the statistics module 314 whether engine knock is occurring via a knock detection signal 334. The detection module 116 may further communicate the raw knock intensity to the knock control module 92.

Figure 6:
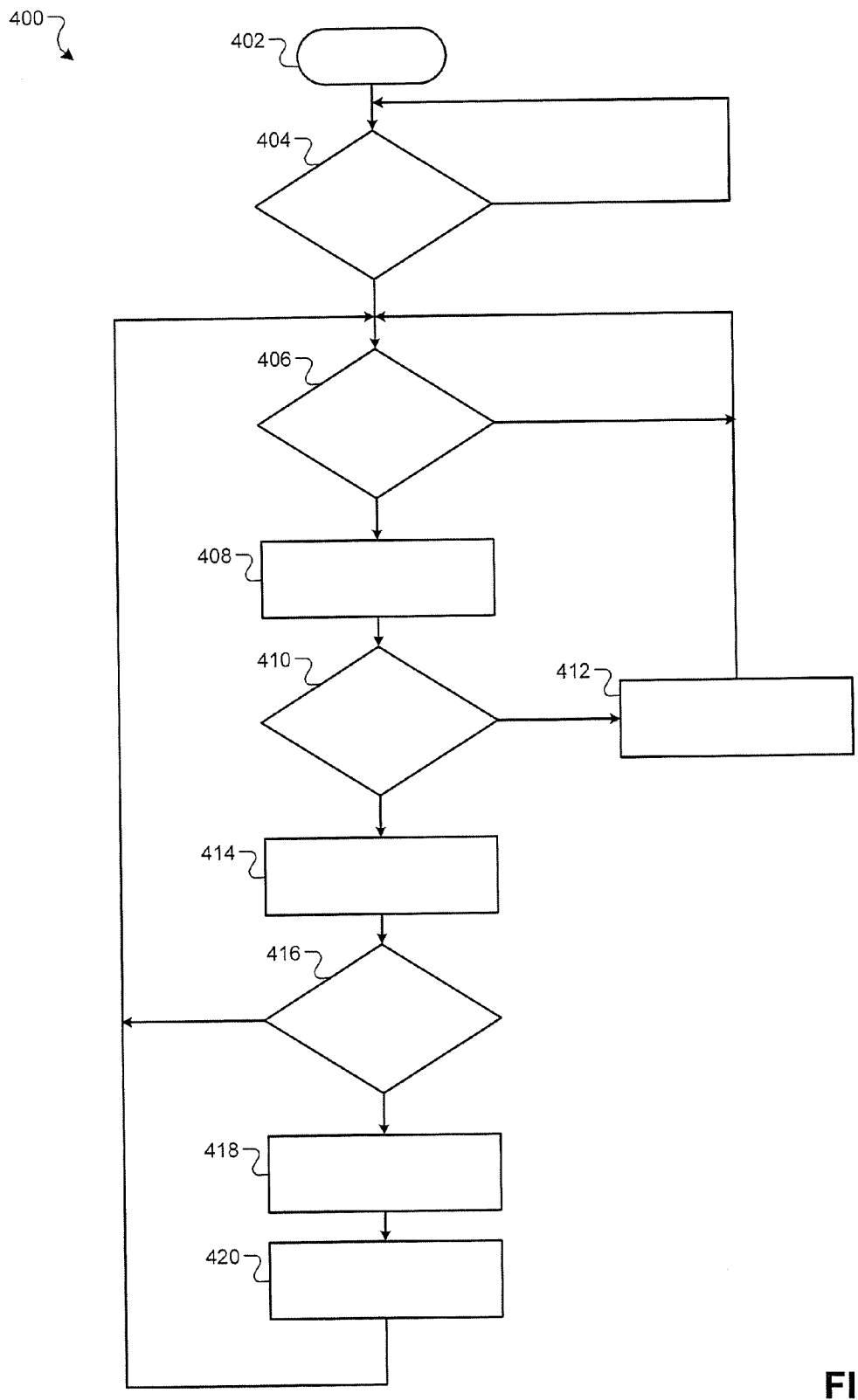
FIG. 6 is a flow chart illustrating an exemplary method for determining background noise vibration data used to detect engine knock according to the present disclosure.

With particular reference to FIG. 6, an exemplary method 400 for determining background noise vibration data used to detect engine knock according to the present disclosure is presented. The background noise vibration data is obtained from mechanical vibration of an engine during periods when no engine knock is detected. The background noise vibration data may include a background noise vibration profile including an average intensity and a standard deviation.

The method 400 is an adaptive method of selectively updating the background noise vibration data based on ethanol concentration. The method 400 may be implemented in one or more modules of a knock detection system, such as the knock detection system 300 discussed above. For clarity, the method 400 will be described with reference to the modules of the knock detection system 300. Accordingly, it will be appreciated that the method 400 depicts exemplary control that may be performed by the ECM 32, and in particular, the statistics module 314.

A start of the method 400 is designated by reference numeral 402. At 404, the ECM 32 determines whether the ICE 30 is running. If yes, then control proceeds at 406, otherwise control loops back as shown. At 406, the ECM 32 determines whether general enablement criteria are met for enabling selective updating of the background noise vibration data based on ethanol concentration. The general enablement criteria may include whether a problem has been detected with one or more of the sensors used to determine the background noise vibration data. The general criteria may be met when no problems are detected. If the general enablement criteria are met, control proceeds at 408, otherwise control loops back as shown.

At 408, the ECM 32 initiates a background learning process and the statistics module 314 begins monitoring the ethanol concentration. As discussed above, the ethanol concentration may be measured by an ethanol sensor (e.g., ethanol sensor 84) or estimated based on one or more engine operating parameters, such as A/F ratio. At 410, the statistics module 314 determines whether the ethanol concentration is stable. If yes, then control proceeds at 414, otherwise control proceeds at 412.

At 412, the statistics module 314 disables the background learning process and resets any partial data sets in the first and second background learning tables. From 412, control loops back as shown.

At 414, the statistics module 314 begins obtaining and storing background noise vibration data for each engine load zone of each cylinder. As discussed above, the background noise vibration data is obtained for combustion events in which engine knock is not detected and includes raw knock intensities and ethanol concentrations. The statistics module 314 stores the information obtained at 414 in the corresponding cells of the first and second background learning tables.

At 416, the statistics module 314 determines whether any background noise vibration data set for an engine load zone of a cylinder is complete. The statistics module 314 determines a background noise vibration data set is complete when the predetermined number P of raw intensities for the engine load zone of a cylinder have been obtained at 414. If any background noise vibration data set is complete, then control continues at 418, otherwise control loops back as shown.

At 418, the statistics module 314 updates the background noise vibration profile by calculating the new average intensity and standard deviation based on the completed data set and storing the new values in the appropriate cells of the background statistics tables. At 420, the statistics module further updates the background noise vibration profile by determining the learned ethanol concentration to be stored with the new average intensity and standard deviation. As discussed above, the statistics module 314 may determine an average ethanol concentration based on the completed data set and store the average ethanol concentration in the appropriate cell of the background ethanol concentration tables. Alternately, the statistics module 314 may store a predetermined default ethanol concentration. From 420, control loops back as shown.

Figure 7:
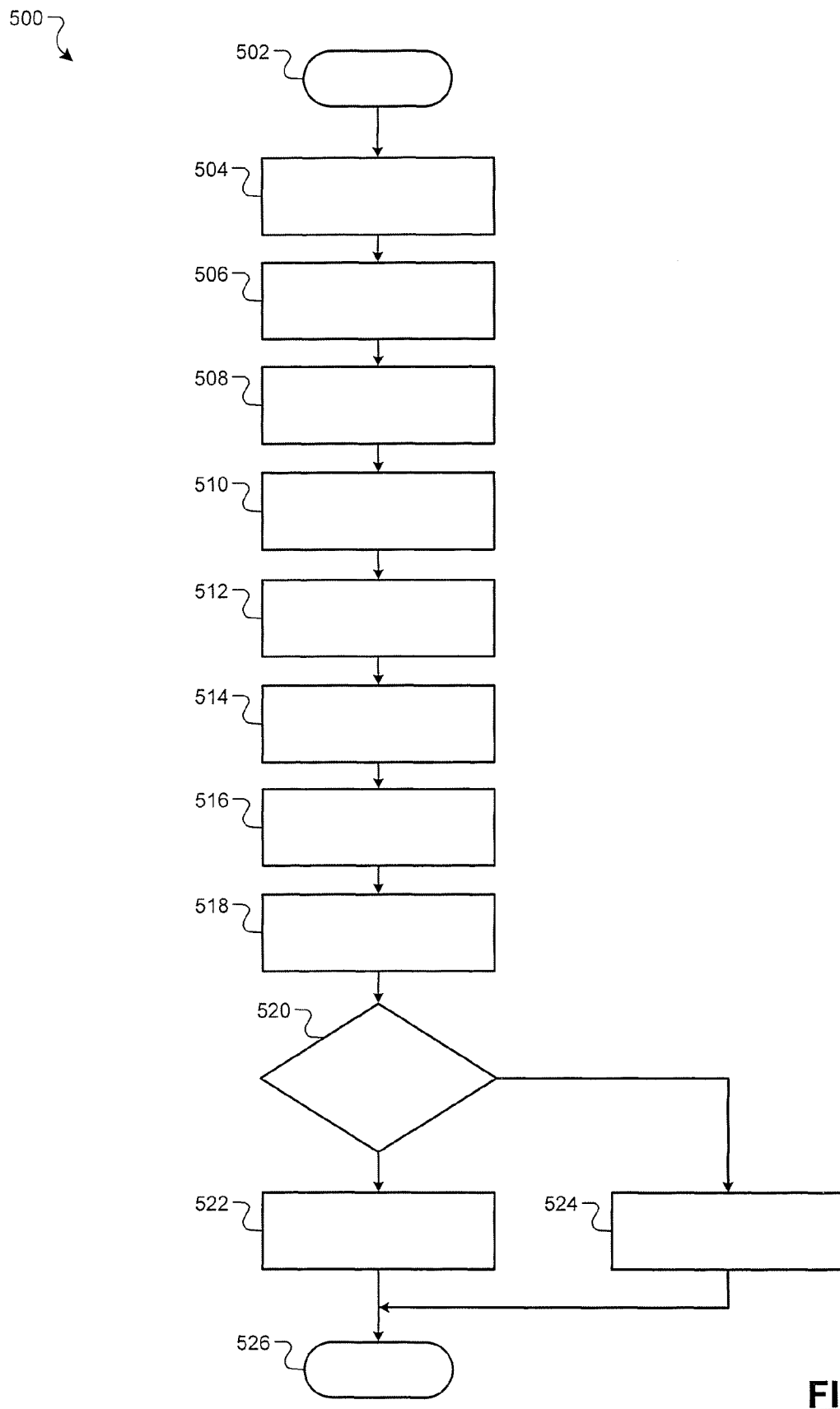
FIG. 7 is a flow chart illustrating another exemplary method for detecting engine knock according to the present disclosure.

With particular reference to FIG. 7, a flow chart illustrating an exemplary method 500 for detecting engine knock according to the present disclosure is presented. The method 500 may be implemented in one or more modules of a knock detection system, such as the knock detection system 300 discussed above. For clarity, the method 500 will be described with reference to the modules of the knock detection system 300. Accordingly, it will be appreciated that the method 500 depicts exemplary control that may be performed by the ECM 32.

A start of the method 500 is designated at 502. At 504, the speed/load module 312 determines the current engine speed and the current engine load for the selected cylinder. At 504, the speed/load module 312 may further determine whether the current engine speed and load fall within one of the predetermined engine load zones. At 506, the intensity module 310 determines the raw knock intensity for the selected cylinder based on the vibration data output by the vibration data module 308.

At 508, the knock threshold module 318 determines the current ethanol concentration of the fuel provided to the selected cylinder. As discussed above, the ethanol concentration may be measured directly by a sensor (e.g., ethanol sensor 84) or estimated based on one or more engine operating parameters, such as A/F ratio. At 510, the knock threshold module 318 selects the background noise vibration profile or profiles to be used to determine the knock control value. If the current engine speed and load determined at 504 fall within one of the predetermined engine load zones, the knock threshold module 318 selects the background noise vibration profile for the corresponding engine load zone. If not, the knock threshold module 318 selects the background noise vibration profiles for the nearest engine load zones.

At 512, the knock threshold module 318 determines the gain to be applied to each of the background noise vibration profiles selected at 510 based on the current ethanol concentration determined at 508 and the learned ethanol concentrations of the selected background noise vibration profiles. As discussed above, the knock threshold module 318 may determine the gain for a selected background noise vibration profile based on a difference between the current ethanol concentration and the learned ethanol concentration of the selected background noise vibration profile. Each gain may be obtained from the gain tables in the memory module 316 based on the difference.

At 514, the knock threshold module 318 determines the expected vibration profile for each selected background noise vibration profile based on the corresponding gain determined at 512. As discussed above, the knock threshold module 318 may determine the expected average intensity by multiplying the average intensity by the gain. The knock threshold module 318 may further determine the expected standard deviation by multiplying the standard deviation by the gain.

At 516, the knock threshold module 318 determines the overall expected vibration profile based on the expected vibration profiles determined at 514. Where a single expected vibration profile was determined from the selected vibration profile, the expected vibration profile is used as the overall expected vibration profile. Where two or more expected vibration profiles were determined from the selected profiles, the overall expected vibration profile is determined through interpolation as discussed above.

At 518, the knock threshold module 318 determines the knock control value based on the overall expected vibration profile determined at 516. As discussed above, the knock control value may be calculated by determining a sum of the expected average intensity and a product of the number S and the expected standard deviation.

At 520, the detection module 320 determines whether the raw knock intensity determined at 504 for the selected cylinder is greater than the knock control value determined at 518 for the selected cylinder. If yes, then the detection module 320 signals that engine knock is detected in the selected cylinder as indicated at reference numeral 522. Otherwise, the detection module 320 signals engine knock is not detected in the selected cylinder as indicated at reference numeral 524. From one of 522 and 524, the method 500 may end for the selected cylinder as indicated at reference numeral 526. Control may return to start to begin another control loop for detecting engine knock for another selected cylinder.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A knock detection system for an engine, comprising:
   an intensity module that determines an engine vibration intensity during a first period of engine operation;
   a knock threshold module that determines a knock threshold based on an ethanol concentration in a fuel supplied to said engine; and
   a detection module that determines whether engine knock has occurred during said first period by comparing said knock threshold and said engine vibration intensity.

2. The knock detection system of claim 1, wherein said knock threshold module determines a correction value based on said ethanol concentration and determines said knock threshold based on said correction value and a predetermined knock threshold.

3. The knock detection system of claim 1, further comprising a statistics module that determines vibration intensity statistics based on engine vibration during a second period prior to said first period when said detection module has determined engine knock has not occurred, wherein said knock threshold module further determines said knock threshold based on said vibration intensity statistics.

4. The knock detection system of claim 3, wherein said vibration intensity statistics include an average value and a standard deviation value.

5. The knock detection system of claim 3, wherein said knock threshold module determines a correction value based on a first ethanol concentration during said first period and a second ethanol concentration during said second period and further determines said knock threshold based on said correction value.

6. The knock detection system of claim 5, wherein said knock threshold module determines said correction value based on a difference between said first ethanol concentration and said second ethanol concentration.

7. The knock detection system of claim 1, further comprising a statistics module that periodically updates vibration intensity statistics based on engine vibration during second periods when said detection module has determined engine knock has not occurred, wherein said statistics module refrains from updating said vibration intensity statistics when a change in said ethanol concentration is greater than a predetermined change, and wherein said knock threshold module further determines said knock threshold on said vibration intensity statistics.

8. The knock detection system of claim 1, further comprising a statistics module that selectively updates a vibration intensity profile when a change in said ethanol concentration is less than a predetermined change, wherein said knock threshold module further determines said knock threshold based on said vibration intensity profile.

9. The knock detection system of claim 8, further comprising:
an ethanol module that outputs an ethanol signal indicative of said ethanol concentration; and
a diagnostic module that detects an error in said ethanol signal, wherein said statistics module selectively updates an ethanol concentration value of said vibration intensity profile to a predetermined value based on said error.

10. The knock detection system of claim 1, wherein said first period corresponds to a knock window of a cylinder of said engine and at least one of a duration and a phase of said knock window is based on said ethanol concentration.

11. A method for an engine, comprising:
determining an engine vibration intensity during a first period of engine operation;
determining a knock threshold based on an ethanol concentration in a fuel supplied to said engine; and
determining whether engine knock has occurred during said first period by comparing said knock threshold and said engine vibration intensity.

12. The method of claim 11, wherein said determining said knock threshold includes determining a correction value based on said ethanol concentration and determining said knock threshold based on said correction value and a predetermined knock threshold.

13. The method of claim 11, further comprising determining vibration intensity statistics based on engine vibration during a second period prior to said first period when engine knock has not occurred, wherein said determining said knock threshold further includes determining said knock threshold based on said vibration intensity statistics.

14. The method of claim 13, wherein said vibration intensity statistics include an average value and a standard deviation value.

15. The method of claim 13, wherein said determining said knock threshold includes determining a correction value based on a first ethanol concentration during said first period and a second ethanol concentration during said second period and determining said knock threshold based on said correction value.

16. The method of claim 15, wherein said determining said correction value includes determining said correction value based on a difference between said first ethanol concentration and said second ethanol concentration.

17. The method of claim 11, further comprising:
periodically updating vibration intensity statistics based on engine vibration during second periods when engine knock has not occurred; and
refraining from updating said vibration intensity statistics when a change in said ethanol concentration is greater than a predetermined change, wherein said determining said knock threshold further includes determining said knock threshold based on said vibration intensity statistics.

18. The method of claim 11, further comprising selectively updating a vibration intensity profile when a change in said ethanol concentration is less than a predetermined change, wherein said determining said knock threshold further includes determining said knock threshold based on said vibration intensity profile.

19. The method of claim 18, further comprising:
outputting an ethanol signal indicative of said ethanol concentration; and
detecting an error in said ethanol signal,
wherein said selectively updating said vibration intensity profile includes selectively updating an ethanol concentration value to a predetermined value based on said error.

20. The method of claim 11, further comprising determining a knock window of a cylinder of said engine based on said ethanol concentration, wherein at least one of a duration and a phase of said knock window is based on said ethanol concentration, and wherein said first period corresponds to said knock window.

* * * * *